United States Patent
Macias et al.

(10) Patent No.: US 11,423,469 B2
(45) Date of Patent: Aug. 23, 2022

(54) COMPUTER-IMPLEMENTED METHOD AND SYSTEM FOR SMART APPLIANCE PRODUCT SEGMENTATION AND COMMUNICATION

(71) Applicant: Visa International Service Association, San Francisco, CA (US)

(72) Inventors: Daniel Edward Macias, San Francisco, CA (US); Aparna Krishnan Girish, Fremont, CA (US)

(73) Assignee: Visa International Service Association, San Francisco, CA (US)

( * ) Notice: Subject to any disclaimer, the term of this patent is extended or adjusted under 35 U.S.C. 154(b) by 187 days.

(21) Appl. No.: 16/604,588

(22) PCT Filed: Apr. 12, 2018

(86) PCT No.: PCT/US2018/027246
§ 371 (c)(1),
(2) Date: Oct. 11, 2019

(87) PCT Pub. No.: WO2018/191463
PCT Pub. Date: Oct. 18, 2018

(65) Prior Publication Data
US 2021/0110463 A1    Apr. 15, 2021

Related U.S. Application Data

(60) Provisional application No. 62/485,215, filed on Apr. 13, 2017.

(51) Int. Cl.
*G06Q 30/00* (2012.01)
*G06Q 30/06* (2012.01)
(Continued)

(52) U.S. Cl.
CPC ..... *G06Q 30/0641* (2013.01); *G06Q 30/0224* (2013.01); *G06Q 30/0255* (2013.01);
(Continued)

(58) Field of Classification Search
CPC .......... G06Q 30/0641; G06Q 30/0224; G06Q 30/0255; G06Q 30/0627; G06Q 30/0631
See application file for complete search history.

(56) References Cited

U.S. PATENT DOCUMENTS

2010/0185509 A1    7/2010    Higgins et al.
2010/0268595 A1    10/2010    Littrell
(Continued)

OTHER PUBLICATIONS

Nawara, Dina, and Rasha Kashef. "Iot-based recommendation systems—an overview." 2020 IEEE International IOT, Electronics and Mechatronics Conference (IEMTRONICS). IEEE, 2020.*

*Primary Examiner* — Kathleen Palavecino
(74) *Attorney, Agent, or Firm* — The Webb Law Firm (57) ABSTRACT

A computer-implemented method for smart appliance product segmentation and communication, including: generating, with at least one processor, a plurality of product interest codes; assigning, with at least one processor, at least one product interest code of the plurality of product interest codes to each of a plurality of products of at least one merchant; based at least partially on a profile of a smart appliance user, associating, with at least one processor, at least one product interest code of the plurality of product interest codes with an interaction between the smart appliance user and at least one smart appliance; matching, with at least one processor, that at least one product interest code of at least one product with the at least one product interest code associated with the interaction; and automatically generating and transmitting, with at least one processor, at least one communication to the smart appliance user.

18 Claims, 6 Drawing Sheets

(51) Int. Cl.
*G06Q 30/02* (2012.01)
*G16Y 10/45* (2020.01)

(52) U.S. Cl.
CPC ..... *G06Q 30/0627* (2013.01); *G06Q 30/0631* (2013.01); *G16Y 10/45* (2020.01)

(56) References Cited

U.S. PATENT DOCUMENTS

2015/0019342 A1\* 1/2015 Gupta ................ G06Q 30/0269
705/14.66
2016/0140526 A1 5/2016 Cummins et al.

\* cited by examiner

COMPUTER-IMPLEMENTED METHOD AND SYSTEM FOR SMART APPLIANCE PRODUCT SEGMENTATION AND COMMUNICATION

CROSS-REFERENCE TO RELATED APPLICATIONS

This application is the United States national phase of International Application No. PCT/US2018/027246 filed Apr. 12, 2018, and claims priority to U.S. Provisional Patent Application No. 62/485,215 filed Apr. 13, 2017, the disclosures of which are hereby incorporated by reference in their entirety.

BACKGROUND

Technical Field

This disclosure relates generally to smart appliance product directories and transactions, and in particular to a computer-implemented method and system for segmenting and matching products for, and communications with, potential consumers, as well as a computer-implemented method and system for facilitating transactions between smart appliance users and merchants using an interest matching process.

Technical Considerations

Resource providers, such as merchants, provide goods, services, and other resources to customers. In order to curate products and services to be offered to customers, and to decrease the amount of time customers must spend searching for and ordering products and services, merchants may provide a product directory to advertise or suggest products to a customer. For example, such a product directory may track the purchases of a group of customers and compile a database associating products that customers tend to purchase together. When a specific customer views or purchases one product, the product directory may identify other products to the customer that appear to be relevant to the viewed or purchased product. Additionally or alternatively, the product directory may identify products to a specific customer related to the products that customer has purchased in the past.

Existing product directories are mutually beneficial to merchants and customers. For example, merchants are able to more efficiently advertise their products and services, while customers receive information on products that they may not otherwise have known existed or would not have thought to purchase. When the product directory identifies a product that the customer was already intending to purchase, the customer is saved the time and inconvenience of identifying it himself/herself.

However, a technical issue that arises in existing product directories is the limited ability of the product directory to accurately identify the intent or preferences of a customer based on the nature and content of a particular transaction. Specific customers normally have unique and personal preferences, intent, or motivations that may not be accounted for simply by associating products that may be purchased together by other customers. Accordingly, existing product directories cannot account for aspects of a specific customer's lifestyle, activities, and/or personal preferences, which are better indicators of the products and services that customer is likely to purchase.

Further, existing systems do not provide a secure transaction platform for customers to purchase products and services through certain devices. As more "Internet of Things" ("IoT") devices, such as smart appliances, provide their own local purchasing platforms and services, customer security becomes an increasing concern. Particularly, sensitive customer financial information, such as credit card information, should be appropriately secured and protected regardless of the communication paths between the customer and the merchant that include the IoT device.

Accordingly, there is a need in the technological arts for providing systems and methods for implementing, managing, controlling, or otherwise processing customer interest or preference data to allow merchants to effectively curate and offer their products and services to specific customers. Additionally, there exists a need in the technological arts for providing systems and methods for implementing secure transactions between merchants and customers using IoT devices, hereinafter "smart appliances".

SUMMARY

Accordingly, and generally, provided is an improved computer-implemented method, system, and computer program product for smart appliance product segmentation and communication.

In non-limiting embodiments or aspects, provided is a computer-implemented method for smart appliance product segmentation and communication, comprising: (a) generating, with at least one processor, a plurality of product interest codes; (b) assigning, with at least one processor, at least one product interest code of the plurality of product interest codes to each of a plurality of products of at least one merchant; (c) based at least partially on a profile of a smart appliance user, associating, with at least one processor, at least one product interest code of the plurality of product interest codes with an interaction between the smart appliance user and at least one smart appliance; (d) matching, with at least one processor, that at least one product interest code of at least one product with the at least one product interest code associated with the interaction; and (e) automatically generating and transmitting, with at least one processor, at least one communication to the smart appliance user.

In non-limiting embodiments or aspects, at least one product interest code of the plurality of product interest codes comprises at least one of the following: a stock keeping unit (SKU), a universal product code (UPC), a category, a subcategory, a product category, a product group, a project code, a weight, a ranking, a partner-assigned code, a merchant-assigned code, a user-assigned code, an alphanumeric code, or any combination thereof.

In non-limiting embodiments or aspects, the plurality of products are segmented according to at least one of the following: smart appliance type, partner, merchant, transaction type, merchant data, user data, subscription data, weighting data, ranking data, or any combination thereof.

In non-limiting embodiments or aspects, the at least one communication comprises at least one of the following: an advertisement, an offer, a discount, a link, an interactive interface, a selectable element, a voice-based communication, a plurality of products, or any combination thereof.

In non-limiting embodiments or aspects, the interaction is a transaction interaction between the smart appliance user and at least one of the following: the at least one smart appliance, a point-of-sale, a smart phone, a computer, or any combination thereof. In another non-limiting embodiment or aspect, the interaction comprises a transaction interaction between the smart appliance user and the at least one smart appliance, and wherein the at least one communication comprises an advertisement for purchase of at least one product.

In non-limiting embodiments or aspects, the profile of the smart appliance user comprises at least one of the following: user data, transaction data, browsing data, searching data, historical data, a response to a query, behavioral data, interaction data, interest data, at least one product interest code, or any combination thereof. In another non-limiting embodiment or aspect, the step (c) comprises: (c1) analyzing the profile of the smart appliance user; (c2) analyzing the interaction between the smart appliance user and the at least one smart appliance; and (c3) assigning at least one product interest code to the interaction. In a further non-limiting embodiment or aspect, the analysis is performed by at least one of the following: a computer, a server, the at least one smart appliance, a merchant server, a transaction processing server, a third-party server, or any combination thereof.

In non-limiting embodiments or aspects, each of the plurality of products is associated with at least one of the following: merchant name, product name, product image, short description, detailed description, video, unit price, delivery method, delivery costs, stock data, inventory data, promotional data, or any combination thereof.

In non-limiting embodiments or aspects, the method further comprises modifying at least one product interest code assigned to at least one product based upon at least one of the following: user interaction with the at least one smart appliance, user interaction with a link, transaction success, transaction failure, transaction termination, user viewing behavior, user online interaction, or any combination thereof.

In non-limiting embodiments or aspects, at least one product interest code comprises at least one weight or rank, wherein the step (d) is performed at least partially based on the at least one weight or rank.

In non-limiting embodiments or aspects, the step (d) is performed based upon a one-to-one match between the product interest code of the product and the product interest code associated with the interaction.

In non-limiting embodiments or aspects, the method further comprises automatically generating and transmitting a subsequent communication based at least partially on at least one of the following: user interaction with the at least one smart appliance, user interaction with a link, transaction success, transaction failure, transaction termination, user viewing behavior, user online interaction, or any combination thereof.

In non-limiting embodiments or aspects the method further comprises receiving, from at least one merchant system, product data for at least one product; and assigning each product to at least one of the following: a partner category, a smart appliance category, a user category, a product-type category, an interest category, at least one product interest code, or any combination thereof.

In non-limiting embodiments or aspects, the interaction is a transaction interaction, and the method comprises: transmitting, by the at least one smart appliance, a communication request comprising at least one of the following: a partner category, a smart appliance category, a user category, a product-type category, an interest category, at least one product interest code, or any combination thereof; determining at least one qualifying merchant; determining at least one applicable smart appliance category; and determining at least one product based at least partially on at least one of the following: the at least one product interest code, at least one weight, at least one rank, or any combination thereof.

In non-limiting embodiments or aspects, the profile of the smart appliance user is generated based on data from at least one of the following: a transaction processing provider, the at least one smart appliance, a third-party server, a partner, a merchant, or any combination thereof.

In non-limiting embodiments or aspects, provided is a computer-implemented method for facilitating a transaction of a smart appliance user, comprising: automatically generating and transmitting at least one communication to the smart appliance user based at least partially on a matching process between user profile data and selected product data in a product database; after selection of at least one product of a merchant in the at least one communication, causing an initiation of an authorization request for the transaction with a transaction processing server, the authorization request comprising a transaction amount; based at least partially on a response to the authorization request, automatically transmitting a secured transaction payload to a merchant server associated with the merchant; and based at least partially on data in the secured transaction payload, completing the transaction between the smart appliance user and the merchant for the at least one product.

In non-limiting embodiments or aspects, the at least one communication is configured to cause at least one of the following: visual content generated on a display of the at least one smart appliance, audible content transmitted through a speaker of the at least one smart appliance, or any combination thereof.

In non-limiting embodiments or aspects, the at least one communication is generated based at least partially on an interaction of a user with at least one smart appliance. In another non-limiting embodiment or aspect, the interaction is a transaction interaction, wherein the at least one communication is transmitted after payment information associated with the transaction interaction is received.

In non-limiting embodiments or aspects, the authorization request is generated and transmitted by a user device to the transaction processing server based at least partially on a communication between the at least one smart appliance and the user device. In another non-limiting embodiment or aspect, the secured transaction payload is transmitted from the transaction processing server to at least one of the user device and the at least one smart appliance.

In non-limiting embodiments or aspects, the secured transaction payload is transmitted from at least one of user device and the at least one smart appliance to the merchant server.

In non-limiting embodiments or aspects, the method further comprises transmitting transaction data with the secured transaction payload to the merchant server, the transaction data comprising at least one of the following: transaction data, merchant data, product data, or any combination thereof.

In non-limiting embodiments or aspects, the method further comprises automatically transmitting a payment request from the merchant server to the transaction processing server, the payment request comprising the secured transaction payload.

In non-limiting embodiments or aspects, provided is a system for segmenting and communicating in a smart appliance environment, comprising at least one server including at least one processor programmed or configured to: (a) generate a plurality of product interest codes; (b) assign at least one product interest code of the plurality of product interest codes to each of a plurality of products of at least one merchant; (c) based at least partially on a profile of a smart appliance user, associate at least one product interest code of the plurality of product interest codes with an interaction between the smart appliance user and at least one smart appliance; (d) match the at least one product interest code of at least one product with the at least one product interest code associated with the interaction; and (e) automatically generate and transmit at least one communication to the smart appliance user.

In non-limiting embodiments or aspects, provided is a computer program product for segmenting and communicating in a smart appliance environment, comprising at least one non-transitory computer-readable medium having program instructions stored thereon, which, when executed by at least one processor, causes the at least one processor to: (a) generate a plurality of product interest codes; (b) assign at least one product interest code of the plurality of product interest codes to each of a plurality of products of at least one merchant; (c) based at least partially on a profile of a smart appliance user, associate at least one product interest code of the plurality of product interest codes with an interaction between the smart appliance user and at least one smart appliance; (d) match the at least one product interest code of at least one product with the at least one product interest code associated with the interaction; and (e) automatically generate and transmit at least one communication to the smart appliance user.

Further non-limiting embodiments or aspects will be set forth in the following clauses.

Clause 1: A computer-implemented method for smart appliance product segmentation and communication, comprising: (a) generating, with at least one processor, a plurality of product interest codes; (b) assigning, with at least one processor, at least one product interest code of the plurality of product interest codes to each of a plurality of products of at least one merchant; (c) based at least partially on a profile of a smart appliance user, associating, with at least one processor, at least one product interest code of the plurality of product interest codes with an interaction between the smart appliance user and at least one smart appliance; (d) matching, with at least one processor, that at least one product interest code of at least one product with the at least one product interest code associated with the interaction; and (e) automatically generating and transmitting, with at least one processor, at least one communication to the smart appliance user.

Clause 2: The method of claim 1, wherein at least one product interest code of the plurality of product interest codes comprises at least one of the following: a stock keeping unit (SKU), a universal product code (UPC), a category, a subcategory, a product category, a product group, a project code, a weight, a ranking, a partner-assigned code, a merchant-assigned code, a user-assigned code, an alphanumeric code, or any combination thereof.

Clause 3: The method of claim 1 or 2, wherein the plurality of products are segmented according to at least one of the following: smart appliance type, partner, merchant, transaction type, merchant data, user data, subscription data, weighting data, ranking data, or any combination thereof.

Clause 4: The method of any of claims 1-3, wherein the at least one communication comprises at least one of the following: an advertisement, an offer, a discount, a link, an interactive interface, a selectable element, a voice-based communication, a plurality of products, or any combination thereof.

Clause 5: The method of any of claims 1-4, wherein the interaction is a transaction interaction between the smart appliance user and at least one of the following: the at least one smart appliance, a point-of-sale, a smart phone, a computer, or any combination thereof.

Clause 6: The method of any of claims 1-5, wherein the interaction comprises a transaction interaction between the smart appliance user and the at least one smart appliance, and wherein the at least one communication comprises an advertisement for purchase of at least one product.

Clause 7: The method of any of claims 1-6, wherein the profile of the smart appliance user comprises at least one of the following: user data, transaction data, browsing data, searching data, historical data, a response to a query, behavioral data, interaction data, interest data, at least one product interest code, or any combination thereof.

Clause 8: The method of any of claims 1-7, wherein step (c) comprises: (c1) analyzing the profile of the smart appliance user; (c2) analyzing the interaction between the smart appliance user and the at least one smart appliance; and (c3) assigning at least one product interest code to the interaction.

Clause 9: The method of any of claims 1-8, wherein the analysis is performed by at least one of the following: a computer, a server, the at least one smart appliance, a merchant server, a transaction processing server, a third-party server, or any combination thereof.

Clause 10: The method of any of claims 1-9, wherein each of the plurality of products is associated with at least one of the following: merchant name, product name, product image, short description, detailed description, video, unit price, delivery method, delivery costs, stock data, inventory data, promotional data, or any combination thereof.

Clause 11: The method of any of claims 1-10, further comprising modifying at least one product interest code assigned to at least one product based upon at least one of the following: user interaction with the at least one smart appliance, user interaction with a link, transaction success, transaction failure, transaction termination, user viewing behavior, user online interaction, or any combination thereof.

Clause 12: The method of any of claims 1-11, wherein at least one product interest code comprises at least one weight or rank, wherein the step (d) is performed at least partially based on the at least one weight or rank.

Clause 13: The method of any of claims 1-12, wherein the step (d) is performed based upon a one-to-one match between the product interest code of the product and the product interest code associated with the interaction.

Clause 14: The method of any of claims 1-13, further comprising automatically generating and transmitting a subsequent communication based at least partially on at least one of the following: user interaction with the at least one smart appliance, user interaction with a link, transaction success, transaction failure, transaction termination, user viewing behavior, user online interaction, or any combination thereof.

Clause 15: The method of any of claims 1-14, further comprising: receiving, from at least one merchant system, product data for at least one product; and assigning each product to at least one of the following: a partner category, a smart appliance category, a user category, a product-type category, an interest category, at least one product interest code, or any combination thereof.

Clause 16: The method of any of claims 1-15, wherein the interaction is a transaction interaction, the method comprising: transmitting, by the at least one smart appliance, a communication request comprising at least one of the following: a partner category, a smart appliance category, a user category, a product-type category, an interest category, at least one product interest code, or any combination thereof; determining at least one qualifying merchant; determining at least one applicable smart appliance category; and determining at least one product based at least partially on at least one of the following: the at least one product interest code, at least one weight, at least one rank, or any combination thereof.

Clause 17: The method of any of claims 1-16, wherein the profile of the smart appliance user is generated based on data from at least one of the following: a transaction processing provider, the at least one smart appliance, a third-party server, a partner, a merchant, or any combination thereof.

Clause 18: A computer-implemented method for facilitating a transaction of a smart appliance user, comprising: automatically generating and transmitting at least one communication to the smart appliance user based at least partially on a matching process between user profile data and selected product data in a product database; after selection of at least one product of a merchant in the at least one communication, causing an initiation of an authorization request for the transaction with a transaction processing server, the authorization request comprising a transaction amount; based at least partially on a response to the authorization request, automatically transmitting a secured transaction payload to a merchant server associated with the merchant; and based at least partially on data in the secured transaction payload, completing the transaction between the smart appliance user and the merchant for the at least one product.

Clause 19: The method of claim 18, wherein the at least one communication is configured to cause at least one of the following: visual content generated on a display of the at least one smart appliance, audible content transmitted through a speaker of the at least one smart appliance, or any combination thereof.

Clause 20: The method of claim 18 or 19, wherein the at least one communication is generated based at least partially on an interaction of a user with at least one smart appliance.

Clause 21: The method of any of claims 18-20, wherein the interaction is a transaction interaction, wherein the at least one communication is transmitted after payment information associated with the transaction interaction is received.

Clause 22: The method of any of claims 18-21, wherein the authorization request is generated and transmitted by a user device to the transaction processing server based at least partially on a communication between the at least one smart appliance and the user device.

Clause 23: The method of any of claims 18-22, wherein the secured transaction payload is transmitted from the transaction processing server to at least one of the user device and the at least one smart appliance.

Clause 24: The method of any of claims 18-23, wherein the secured transaction payload is transmitted from at least one of user device and the at least one smart appliance to the merchant server.

Clause 25: The method of any of claims 18-24, further comprising transmitting transaction data with the secured transaction payload to the merchant server, the transaction data comprising at least one of the following: transaction data, merchant data, product data, or any combination thereof.

Clause 26: The method of any of claims 18-25, further comprising automatically transmitting a payment request from the merchant server to the transaction processing server, the payment request comprising the secured transaction payload.

Clause 27: A system for segmenting and communicating in a smart appliance environment, comprising at least one server including at least one processor programmed of configured to: (a) generate a plurality of product interest codes; (b) assign at least one product interest code of the plurality of product interest codes to each of a plurality of products of at least one merchant; (c) based at least partially on a profile of a smart appliance user, associate at least one product interest code of the plurality of product interest codes with an interaction between the smart appliance user and at least one smart appliance; (d) match the at least one product interest code of at least one product with the at least one product interest code associated with the interaction; and (e) automatically generate and transmit at least one communication to the smart appliance user.

Clause 28: A computer program product for segmenting and communicating in a smart appliance environment, comprising at least one non-transitory computer-readable medium having program instructions stored thereon, which, when executed by at least one processor, causes the at least one processor to: (a) generate a plurality of product interest codes; (b) assign at least one product interest code of the plurality of product interest codes to each of a plurality of products of at least one merchant; (c) based at least partially on a profile of a smart appliance user, associate at least one product interest code of the plurality of product interest codes with an interaction between the smart appliance user and at least one smart appliance; (d) match the at least one product interest code of at least one product with the at least one product interest code associated with the interaction; and (e) automatically generate and transmit at least one communication to the smart appliance user.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a," "an," and "the" include plural referents unless the context clearly dictates otherwise.

BRIEF DESCRIPTION OF THE DRAWINGS

Additional advantages and details of the invention are explained in greater detail below with reference to the exemplary embodiments that are illustrated in the accompanying schematic figures, in which.

DETAILED DESCRIPTION

As used herein, the terms "communication" and "communicate" may refer to the reception, receipt, transmission, transfer, provision, and/or the like, of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet, and/or the like) that includes data. It will be appreciated that numerous other arrangements are possible.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "smart appliance" may refer to one or more electronic devices configured to communicate with one or more networks, including, but not limited to a network-enabled appliance (e.g., a network-enabled television, a refrigerator, a thermostat, an IoT device or system, a home appliance, a smart voice-based assistant, a lighting system, a heating/cooling system, a kitchen appliance, a security system, a car-connected device, and/or the like), a computer, a client device, a computing device, a POS system, and/or any other device or system (or software application) capable of communicating with or within a network.

As used herein, the term "portable financial device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments, the portable financial device may include volatile or non-volatile memory to store information (e.g., an account identifier, a name of the account holder, and/or the like).

The term "account data," as used herein, refers to any data concerning one or more accounts for one or more users. Account data may include, for example, one or more account identifiers, user identifiers, transaction histories, balances, credit limits, issuer institution identifiers, and/or the like.

As used herein, the term "server" may refer to or include one or more processors or computers, storage devices, or similar computer arrangements that are operated by or facilitate communication and processing for multiple parties in a network environment, such as the internet, although it will be appreciated that communication may be facilitated over one or more public or private network environments and that various other arrangements are possible. Further, multiple computers, e.g., servers, or other computerized devices, e.g., point-of-sale devices, directly or indirectly communicating in the network environment may constitute a "system," such as a merchant's point-of-sale system. Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "computing device" may refer to one or more electronic devices that are configured to directly or indirectly communicate with or over one or more networks. The computing device may be a mobile device. As an example, a mobile device may include a cellular phone (e.g., a smartphone or standard cellular phone), a portable computer, a wearable device (e.g., watches, glasses, lenses, clothing, and/or the like), a PDA, and/or other like devices. The computing device may not be a mobile device, such as a desktop computer. Still further, a computing device may be or include a smart appliance or network-enabled appliance. Furthermore, the term "computer" may refer to any computing device that includes the necessary components to receive, process, and output data, and normally includes a display, a processor, a memory, an input device, and a network interface. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, etc.).

As used herein, the term "financial device" may refer to a portable payment card (e.g., a portable financial device, a credit card, a debit card, and the like), a gift card, a smartcard, smart media, a payroll card, a healthcare card, a wrist band, a machine-readable medium containing account information, a keychain device or fob, an RFID transponder, a retailer discount or loyalty card, a mobile device executing an electronic wallet application, a personal digital assistant, a security card, an access card, a wireless terminal, and/or a transponder, as examples. The financial device may include a volatile or a non-volatile memory to store information, such as an account identifier or a name of the account holder. The financial device may store account credentials locally on the device, in digital or non-digital representation, or may facilitate accessing account credentials stored in a medium that is accessible by the financial device in a connected network.

Non-limiting embodiments or aspects of the present invention are directed to computer-implemented methods for smart appliance product segmentation, product matching, and communication in a smart appliance environment, and for facilitating a transaction initiated by a smart appliance user. Embodiments or aspects of the present invention provide the technological environment and infrastructure for implementing, managing, controlling, or otherwise processing smart appliance product segmentation, matching, and communication. Embodiments or aspects of the present invention generate product interest codes and/or product interest categories and assign those interest codes to products and/or services of a merchant. Based on a user profile of the smart appliance user, a product interest code or category is associated with an interaction of the smart appliance user with the smart appliance. Based on a communication, a user device and/or a smart appliance may display an advertisement, an offer, a discount, a link, an interface, a selectable element, a voice communication, a product list, or the like to the smart appliance user. In this manner, merchants may curate products and/or services to a user based on the user's profile.

Other non-limiting embodiments or aspects of the present invention provide the technological environment and infrastructure for facilitating a transaction of a smart appliance user interacting in a smart appliance environment. Some embodiments or aspects involve generating and transmitting a communication to the smart appliance user based on matching user profile data with product data, which may be initiated based at least partially on a transaction interaction of the user, such as a shopping behavior or similar interactions. After selection of at least one product in the communication, an authorization request for a transaction may be sent to a transaction processing server. In this manner, a user may authorize a transmission of a secured transaction payload to a merchant via a user's device and/or the smart appliance. Still further, the matching of a smart appliance user with a specific product or products may be a dynamic process that is refined based upon feedback from the smart appliance user, historical data, or information related to the smart appliance user, thereby "learning" more about the user or type of user, to provide more relevant or personalized communications. Generally, non-limiting embodiment or aspects provide a technological environment that facilitates an intuitive assigning and matching system that provides for improved transactional relationships between a smart appliance user and a merchant.

Figure 1:
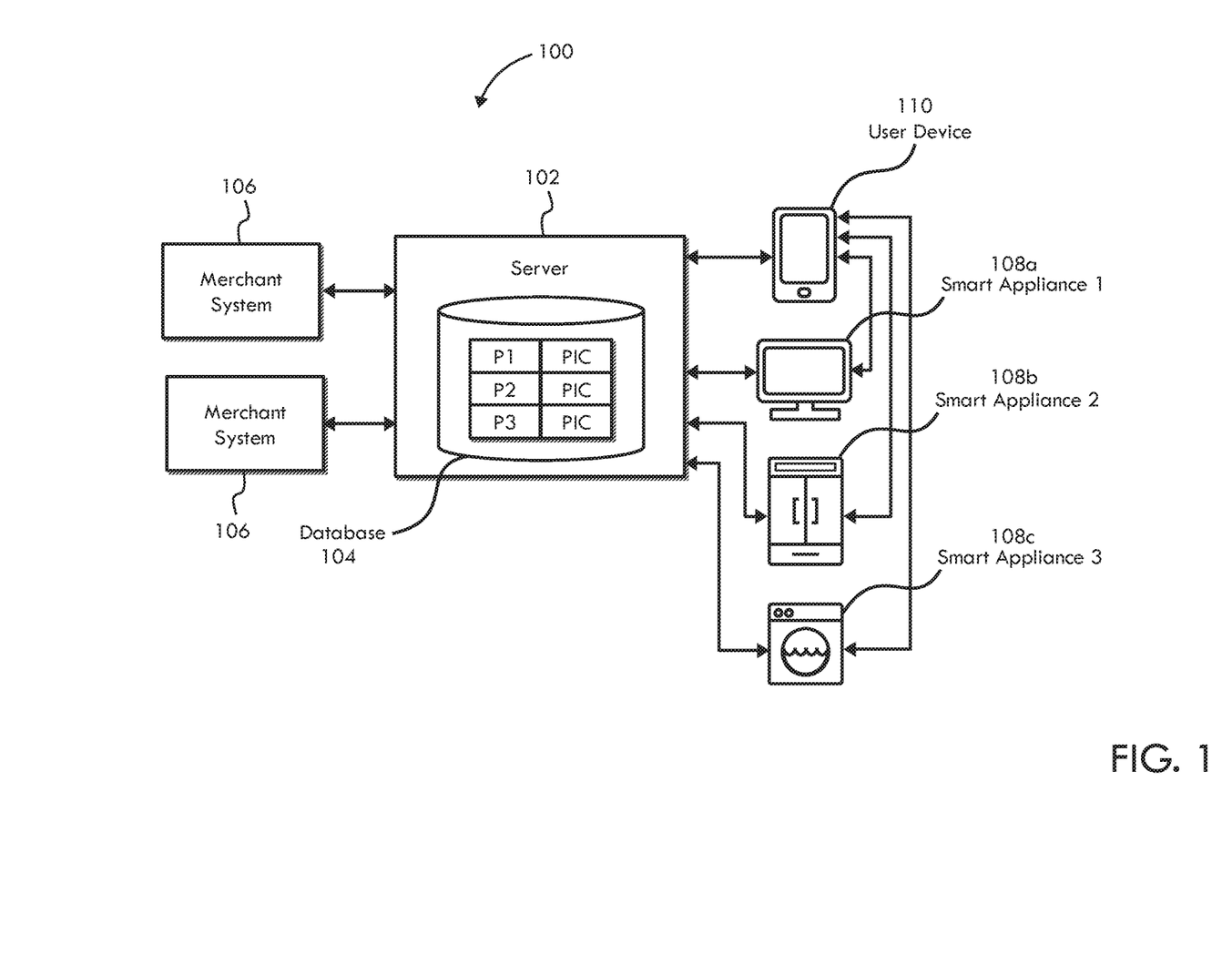
FIG. 1 is a schematic diagram of a non-limiting embodiment or aspect of a computer-implemented method and system for smart appliance segmentation and communication according to the principles of the present invention.

With reference to FIG. 1, and in a non-limiting embodiment or aspect, provided is a computer-implemented method and system 100 for smart appliance product segmentation and communication. This exemplary embodiment includes at least one server 102 (having at least one processor), which is in communication with at least one database 104 programmed or configured to store data for use in implementing the presently-invented method. The at least one server 102 may be associated with a merchant, a transaction processing system (e.g., VisaNet®), a third-party system, a service provider, a smart appliance system, and/or may be distributed and implemented through a combination of multiple servers and systems. In addition, the at least one server 102 may be in communication with one or more merchant systems (e.g., servers operated by the merchant) 106, from which product or associated data is received, such as information and data associated with the merchant and their products, services, or resources (collectively referred to as "products"). Still further, the at least one server 102 may be in communication with one or more smart appliances 108a, 108b, 108c either directly or indirectly through a user device 110, such as a smart phone, a server, computer, and/or other electronic device operated by a user. In this manner, the system 100 represents a network environment that facilitates communication between the at least one server 102, the merchant systems 106, the user devices 110, and the smart appliances 108. The smart appliance 108 may be in the form of any network-enabled consumer device, such as a television, a refrigerator, a washing machine, a kitchen appliance, a portable home network-enabled device, a voice-based assistant, a vehicle-connected device, a thermostat, and the like.

Figure 2:
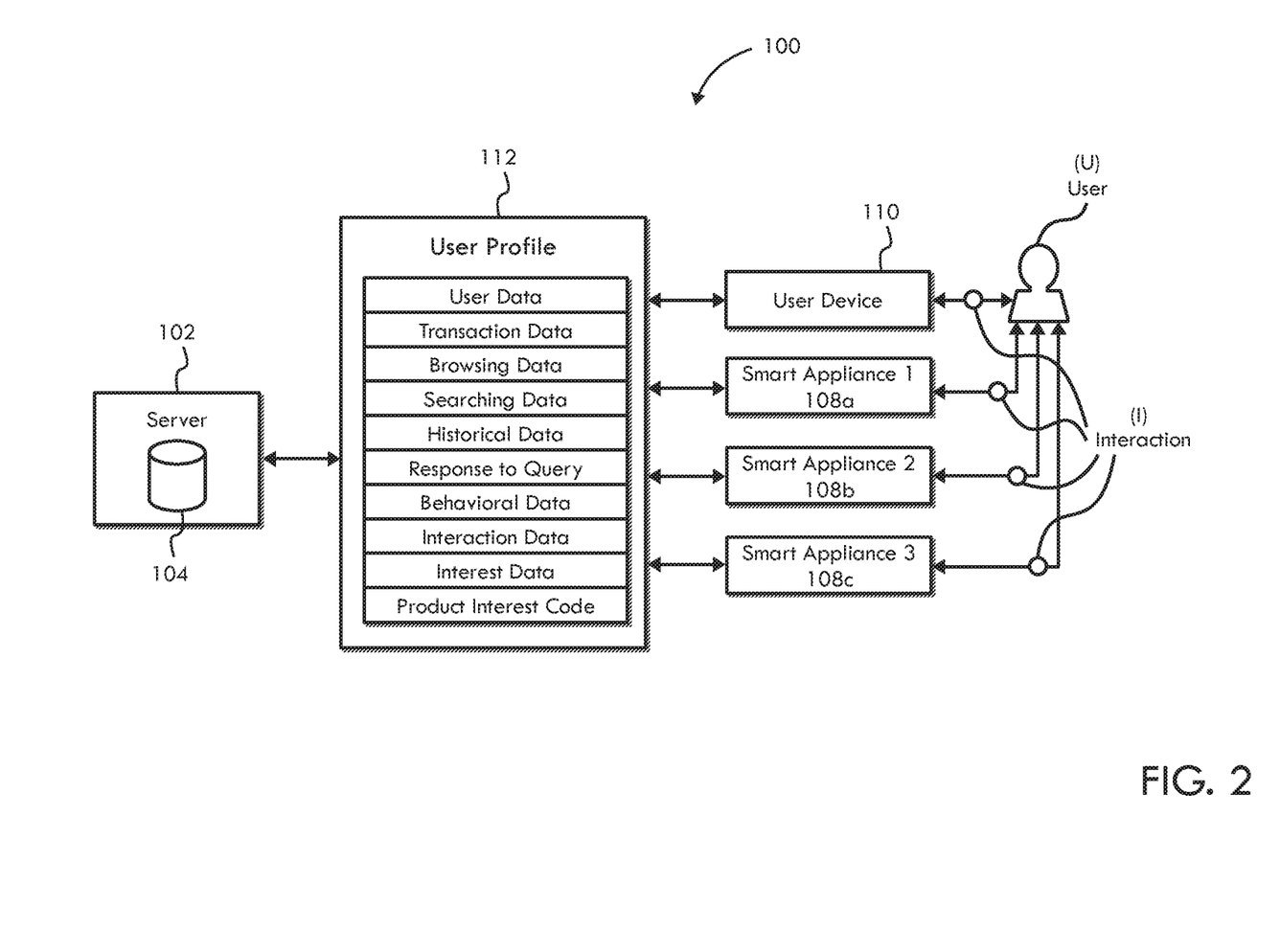
FIG. 2 is a schematic diagram of a non-limiting embodiment or aspect of a computer-implemented method and system for smart appliance segmentation and communication according to the principles of the present invention.

According to non-limiting embodiments or aspects, and with references to FIGS. 1 and 2, a plurality of product interest codes (PICs) are generated and one or more PICs are assigned to each of a plurality of products of one or more merchants. Once each product is associated with or assigned one or more PICs, the information is stored in the database 104 for further use in the method and system 100. Based at least partially on a profile 112 of a smart appliance user (U), the method further includes associating at least one PIC with an interaction (I) between the smart appliance user (U) and at least one smart appliance 108 owned by the user (U). In another non-limiting embodiment or aspect, the interaction (I) may be between the user (U) and his or her user device 110, where the user device 110 is in communication with or operable to monitor or control the smart appliance 108.

In non-limiting embodiment or aspects, and with continued reference to FIG. 2, the user profile 112 may be activated, stored, or otherwise accessible on or through one or more of: the at least one server 102, the user device 110, the smart appliance 108, a third-party device or server, the user's server or network, and/or any computer programmed or configured to create, store, and/or manage the profile data of the smart appliance user (U). Accordingly, a user profile 112 is established and developed for each smart appliance user (U), either at the individual level, the household level, and/or the smart appliance level. Still further, and either in the user profile 112 and/or on the at least one server 102, the user's interests, preferences, and/or motives will be associated with one or more PICs, and based on the interaction (I).

Figure 3:
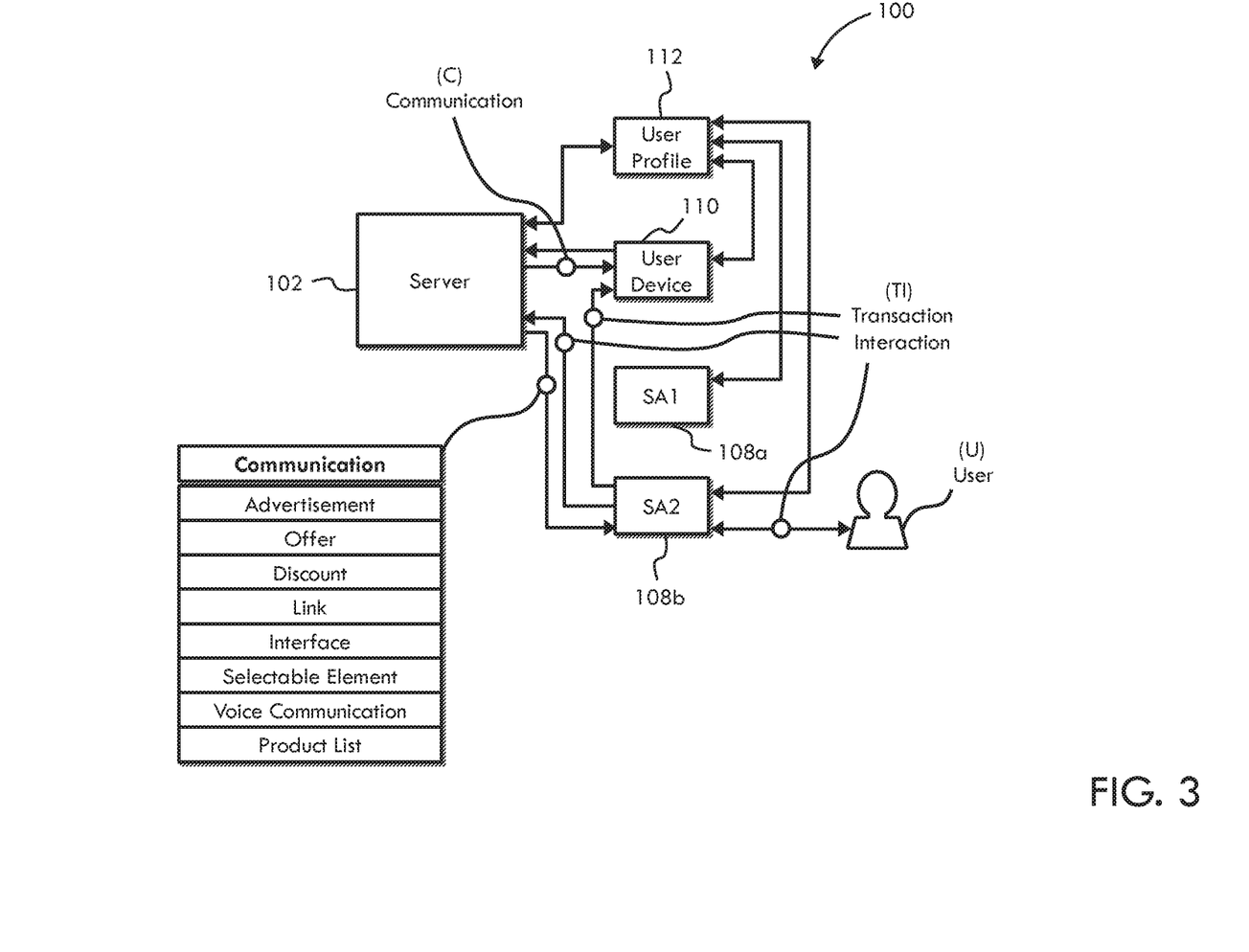
FIG. 3 is a schematic diagram of a non-limiting embodiment or aspect of a computer-implemented method and system for smart appliance segmentation and communication according to the principles of the present invention.

Next, the method may include matching the PIC or PICs of at least one product with the PIC or PICs associated with the interaction (I). As discussed hereinafter, this matching process may entail various matching, assigning, grouping, ranking, and/or weighting techniques. Finally, and as illustrated in FIG. 3, at least one communication (C) is automatically generated and transmitted to the smart appliance user (U), whether at the user device 110, at the smart appliance 108, and/or at some other accessible interface of the user (U). Based upon the assignment and matching process, the content of the communication (C) is modified, tailored, or configured to be relevant to the specific user (U) and/or smart appliance 108.

In non-limiting embodiments or aspects, the PIC may take a variety of forms, including, but not limited to: a stock keeping unit (SKU) (e.g., a product-specific code), a universal product code (UPC), a category (e.g., home/garden, sports, technology, etc.), a subcategory (e.g., cooking, gardening, home design under the home/garden category, baseball, football, basketball under the sport category, consumer products and IoT systems under the technology category, and the like), a product category, a product group, a project code (e.g., a specific project in which the user (U) is engaged), a weight (e.g., a determination of the relevance of the product and user interest), a ranking (e.g., a ranking assigned by a merchant), a partner-assigned code (e.g., a smart appliance manufacture code or category), a merchant-assigned code (e.g., a smart appliance product merchant code or category), a user-assigned code (e.g., an interest code of the user (U)), an alphanumeric code, or any combination thereof.

In non-limiting embodiments or aspects, the products of the merchant may be segmented into specified searchable categories. These categories may be associated with one or more unique PICs. For example, the products may be segmented according to at least one of the following: smart appliance type (e.g., a home appliance, a smart voice-based assistant, a refrigerator, a lighting system, a heating/cooling system, a kitchen appliance, a security system, a car-connected device, etc.), partner (e.g., a smart appliance manufacturer), merchant (e.g., a provider of products or services), transaction type (e.g., debit, credit, repeat, first-time, etc.), merchant data (e.g., merchant-specific information), user data (e.g., user-specific information), subscription data (e.g., merchants or partners that subscribe for participation in the system 100, with the option of identifying specific product catalogs, specific products, product groupings, individual items, and the like for inclusion in the communication (C) generated for a particular interaction (I)), weighting data (e.g., weighting for relevance), ranking data (e.g., ranking by the merchant), or any combination thereof.

In non-limiting embodiments or aspects, and with reference to FIG. 3, the content and nature of the communication (C) may take a variety of forms, such as at least one of the following: an advertisement, an offer, a discount, a link (e.g., a link that can be activated to direct the user (U) to an online location), an interactive interface (e.g., a graphical user interface (GUI)), a selectable element, a voice-based communication (e.g., a voice communication from a smart voice assistant), a plurality of products (e.g., a listing of multiple products that meet the interest criteria, or PIC), or any combination thereof. In non-limiting embodiments or aspects, the communication (C) is configured to cause at least one of the following: visual content generated on a display of the smart appliance 108 or user device 110, audible content transmitted through a speaker of the smart appliance 108 or user device 110, or any combination thereof.

With continued reference to FIG. 3, and in non-limiting embodiments or aspects, the interaction (I) is a transaction interaction (TI) between the smart appliance user (U) and the smart appliance 108, a point-of-sale, a smart phone (e.g., a user device 110), and/or a computer or server. Such a transaction interaction (TI), as potentially identified by the smart appliance 108, may be determined based upon a shopping behavior of the user (U). For example, the transaction interaction (TI) is between the smart appliance user (U) and one of his or her smart appliances 108 (e.g., smart appliance 108b), and, after the matching process, the communication (C) is in the form of an advertisement or offer for one or more relevant products of at least one merchant.

Figure 4:
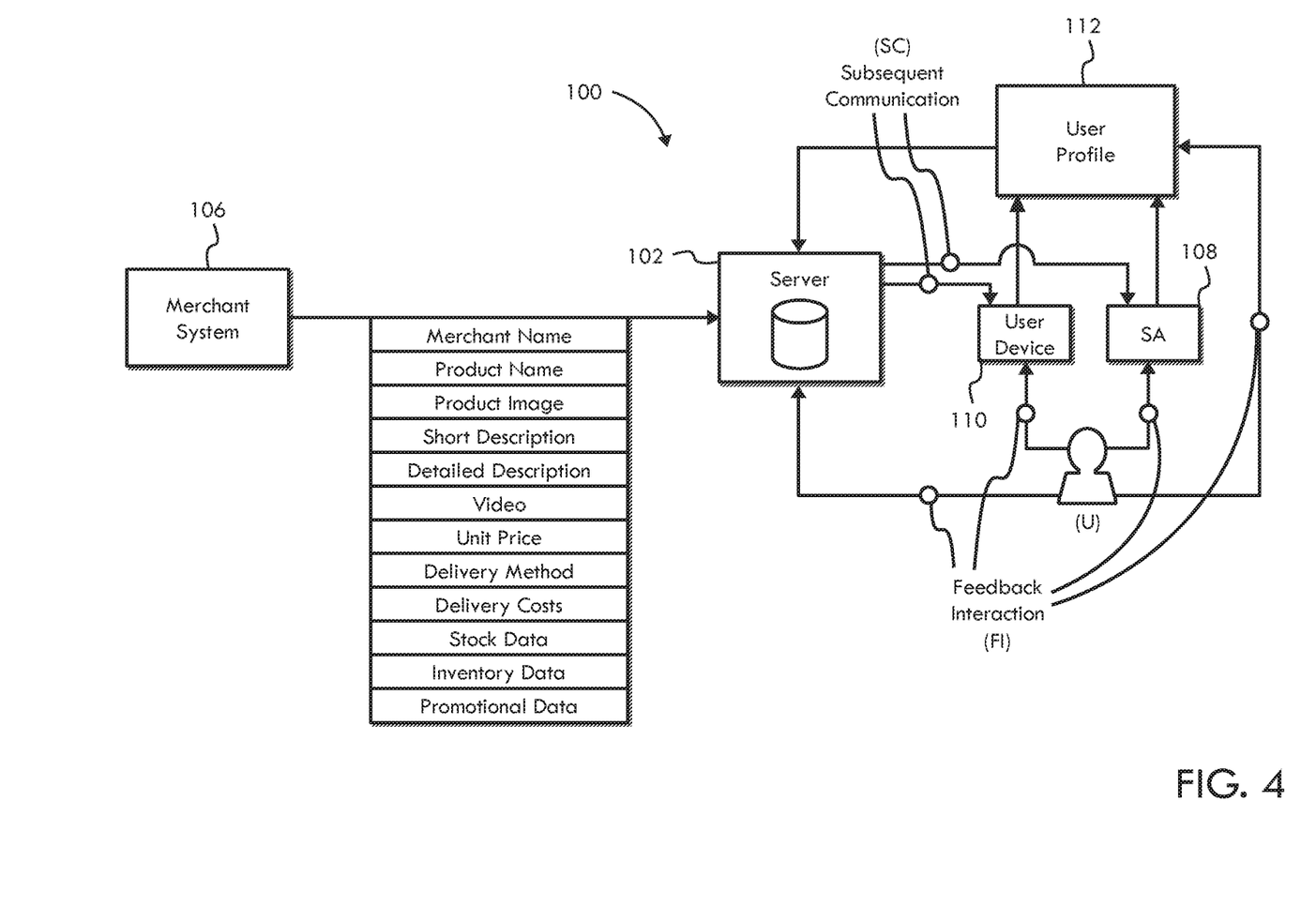
FIG. 4 is a schematic diagram of a non-limiting embodiment or aspect of a computer-implemented method and system for smart appliance segmentation and communication according to the principles of the present invention.

In non-limiting embodiments or aspects, and with reference to FIG. 4, the user profile 112 of the smart appliance user (U) includes information or data that may be used to determine relevant interests and/or one or more PICs. For example, the user profile 112 may be populated with one or more of the following: user data (e.g., demographic, age, gender, income, etc.), transaction data (e.g., data related to the present or historical transactions of the user (U)), browsing data, searching data, historical data (e.g., data regarding previous interactions between the user (U) and the smart appliance 108), a response to a query (e.g., responses to specific questions posed to the user (U)), behavioral data, interaction data, interest data, at least one product interest code (e.g., a PIC assigned at the smart appliance level, the server level, or selected by the user (U)), or any combination thereof. In non-limiting embodiments or aspects, associating the PIC with an interaction (I) between the user (U) and a smart appliance 108 may include the sub-steps of: analyzing the profile 112 of the smart appliance user (U); analyzing the interaction (I) between the smart appliance user (U) and the smart appliance 108; and assigning at least one PIC to the interaction (I). In non-limiting embodiments or aspects, the analysis is performed by at least one of the following: a computer, a computing device, a processor, the at least one server 102, the at least one smart appliance 108, a merchant system 106 or server, a transaction processing server (e.g., VisaNet®), a third-party server (e.g., a partner system or server operated by a partner), or any combination thereof. In addition, and with continued reference to FIG. 4, each of the products is associated with at least one of the following: merchant name, product name, product image, short description, detailed description, video, unit price, delivery method, delivery costs, stock data, inventory data, promotional data, or any combination thereof. In addition, this information and data may be provided from the merchant system 106 to the at least one server 102, such as through a merchant interface (not shown).

As illustrated in FIG. 4, and non-limiting embodiments or aspects, the method and system 100 includes a dynamic feedback and modification function. For example, one or more components of the system 100 may be programmed or configured to modify one or more PICs that have been assigned to at least one product based upon at least one of the following: user interaction (e.g., a feedback interaction (FI) with one or more of his or her smart appliances 108, user devices 110, and/or the at least one server 102), user interaction with a link, an indication of a successful transaction, an indication of a failed transaction, an indication of a prematurely terminated transaction, user viewing behavior, user online interaction, or any combination thereof. In non-limiting embodiments or aspects, one or more components of the system 100 may be programmed or configured to automatically generate and transmit a subsequent (or revised) communication (SC) to the user (U), such as through his or her user device 110 or smart appliance 108. For example, and based upon feedback interaction (FI), a subsequent communication (SC) may be generated and transmitted and include revised, and potentially more tailored or relevant content, to the user (U). Accordingly, this feedback loop provides a dynamic "learning" environment to provide more relevant information to the user (U). In addition, this subsequent communication (SC) may be based at least partially on at least one of the following: user interaction (e.g., a feedback interaction (FI) with one or more of his or her smart appliances 108, user devices 110, and/or the at least one server 102), user interaction with a link, an indication of a successful transaction, an indication of a failed transaction, an indication of a prematurely terminated transaction, user viewing behavior, user online interaction, or any combination thereof. In addition, this feedback may be used to update the user profile 112 in an iterative process that may be used in connection with a subsequent interaction (I).

Figure 5:
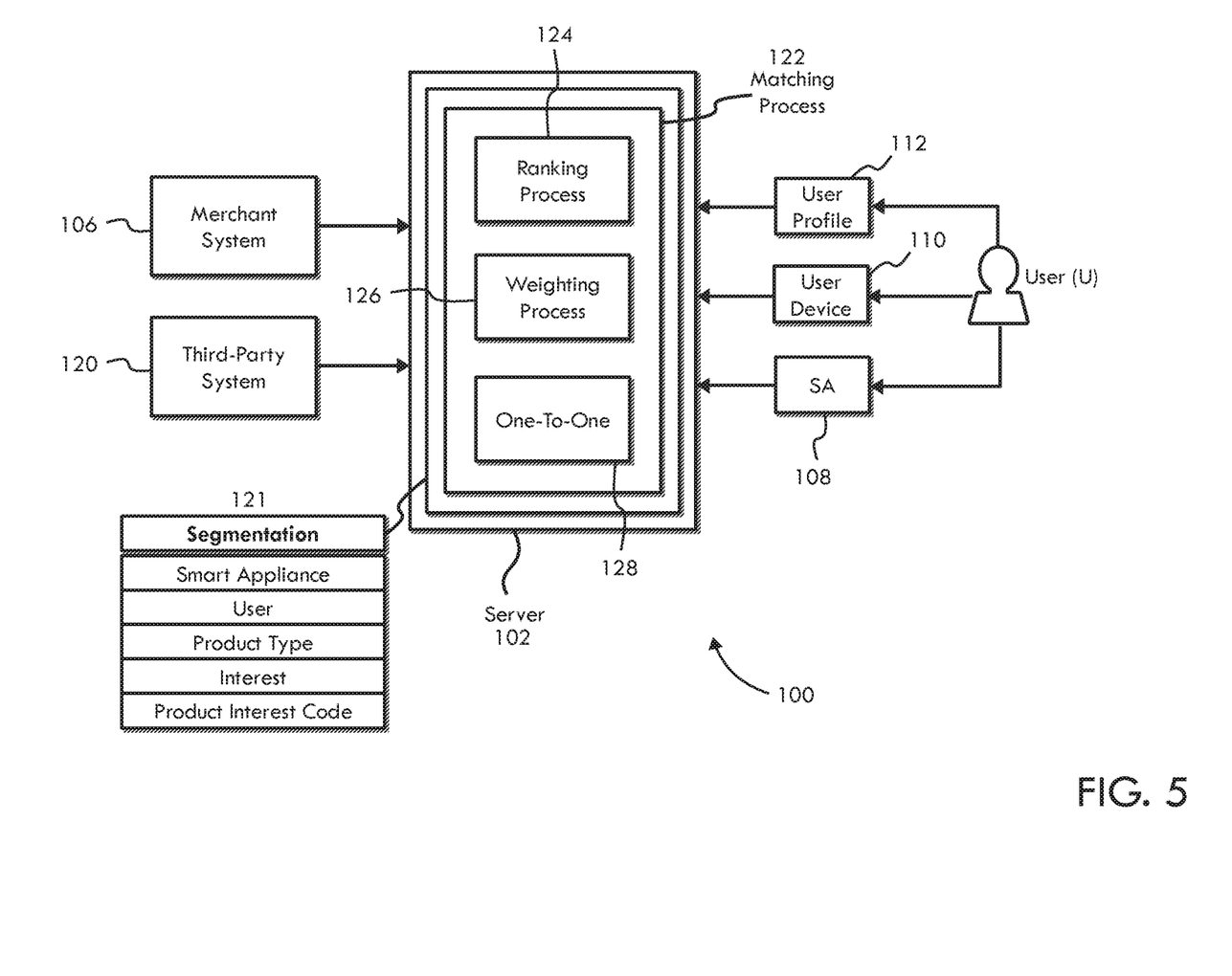
FIG. 5 is a schematic diagram of a non-limiting embodiment or aspect of a computer-implemented method and system for smart appliance segmentation and communication according to the principles of the present invention.

As discussed above, and in non-limiting embodiments or aspects, and with reference to FIG. 5, the interest information and/or interaction (I) data is received from or through the user profile 112, the user device 110, and/or the smart appliance 108. Similarly, the product information and data is received from or through a merchant system 106 and smart appliance data is received from or through a third-party system 120 (e.g., a partner system). Initially, in a segmentation process 121, the merchant data and/or product data is segmented or categorized, such as by smart appliance type, user data, product type, interest, and/or PIC, and used in a matching process 122. As discussed, the matching process 122 may be in the form of or entail a ranking process 124, a weighting process 126, and/or a one-to-one matching process 128.

In non-limiting embodiments or aspects, one or more components of the system 100 (e.g., the at least one server 102) receive, from at least one merchant system 106, product data for at least one product, and assign each product to at least one of the following: a partner category, a smart appliance category, a user category, a product-type category, an interest category, at least one product interest code, or any combination thereof. This assignment process may be part of the segmenting by the merchant system 106 or the at least one server 102.

In non-limiting embodiments or aspects, the interaction (I) is a transaction interaction (TI), and the smart appliance 108 transmits a communication request including at least one of the following: a partner category, a smart appliance category, a user category, a product-type category, an interest category, at least one product interest code, or any combination thereof. One or more components of the system 100 (e.g., the at least one server 102) determine at least one qualifying merchant (e.g., a merchant that has subscribed to the system 100), determine at least one applicable smart appliance category, and determine at least one product based at least partially on at least one of the following: one or more PIC, at least one weight, at least one rank, or any combination thereof. Further, and as discussed above, the user profile 112 of the smart appliance user may be generated or revised based on data from at least one of the following: a transaction processing provider (e.g., VisaNet®), the at least one smart appliance 108, a third-party server, a partner, a merchant, or any combination thereof.

Figure 6:
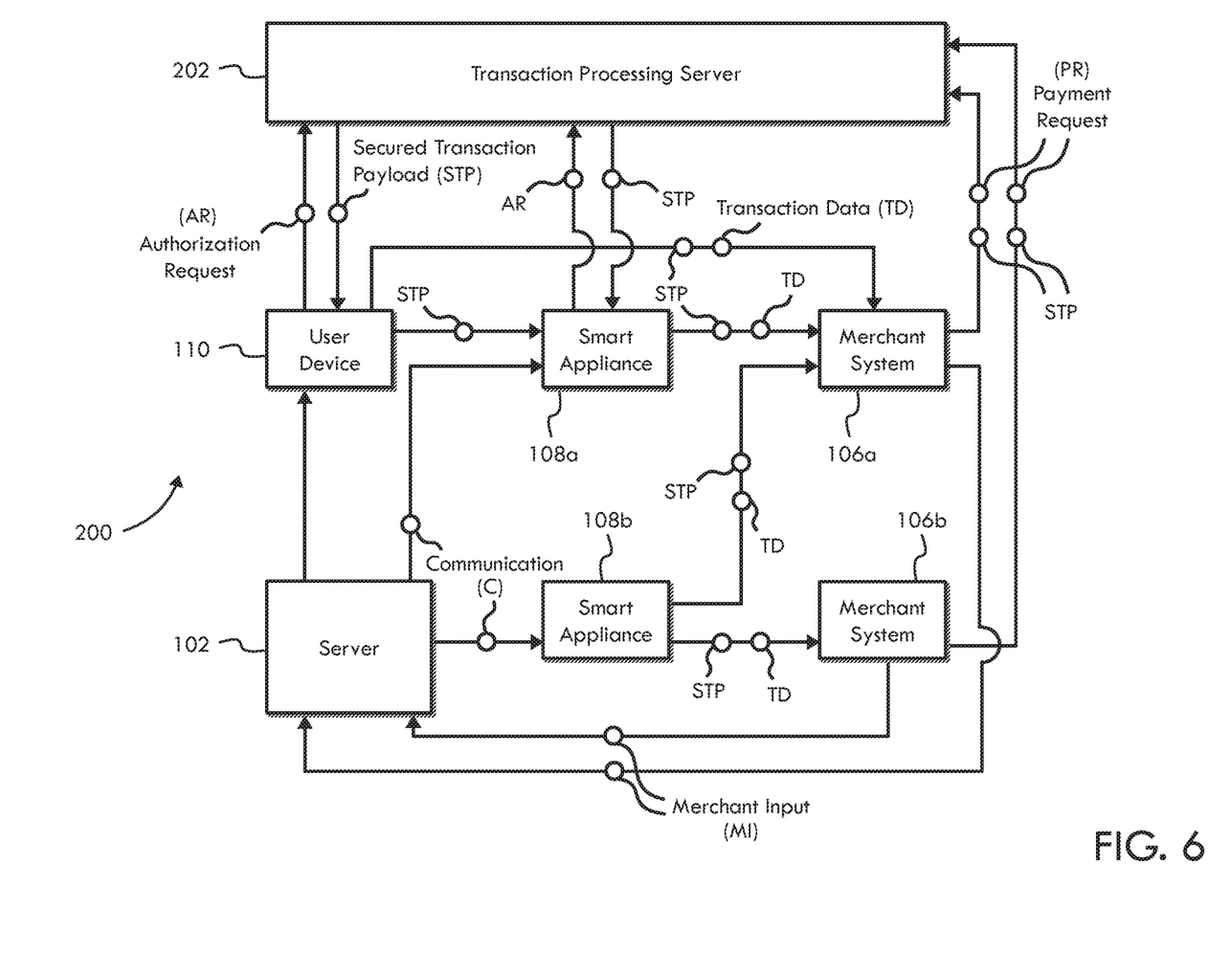
FIG. 6 is a schematic diagram of a computer-implemented method and system for a transaction system for smart appliances according to the principles of the present invention.

In non-limiting embodiments or aspects, and with reference to FIG. 6, provided is a computer-implemented method and system 200 for facilitating a transaction of a smart appliance user (U). In particular, and in this embodiment, the system 200 may include the above-discussed server 102, smart appliance 108a, 108b, merchant system 106a, 106b, and user device 110. Further, the system 200 includes a transaction processing server 202, which processes transactions (typically card-based transactions) between the user (U) and a merchant. Accordingly, and in the example where the user (U) is a portable financial device user, he or she is assigned a primary account number (PAN) that is associated with his or her account. The merchant provides product and service information and data from the merchant system 106a, 106b to the at least one server 102 in the form of merchant input (MI). The nature and content of this product data has been previously discussed.

In non-limiting embodiments or aspects, at least one communication (C) is automatically generated and transmitted to the smart appliance user (U) based at least partially on a matching process between user profile data and selected product data in a product database, which has been discussed above in detail. After selection of at least one product of a merchant in the at least one communication (C), an authorization request (AR) is generated or initiated by or through the user device 110 and/or the smart appliance 108a, 108b, and this authorization request (AR) (which includes at least user data, account data, and transaction amount) is transmitted to the transaction processing server 202 (e.g., VisaNet®). The authorization request (AR) is processed and, if approved, a secured transaction payload (STP) is transmitted to the user device 110 and/or the smart appliance 108a, 108b. In the example where the smart appliance 108a sends the authorization request (AR), the use of a secured (e.g., encrypted) transaction payload (STP) ensures that the smart appliance 108a itself is not capturing or storing sensitive or private information associated with the user (U), such as specific user data, billing information, shipping information, PAN, expiration date, and the like.

In non-limiting embodiments or aspects, and with continued reference to FIG. 6, secured transaction payload (STP) is transmitted (either from the user device 110 or the smart appliance 108a, 108b) to the merchant server or system 106a, 106b associated with the merchant. Based at least partially on the data and information of the secured transaction payload (STP), the transaction between the smart appliance user (U) and the merchant is completed for purchase of the product or service. In non-limiting embodiments or aspects, the method further includes transmitting transaction data (TD) together with the secured transaction payload (STP) to the merchant system 106a, 106b, where the transaction data includes at least one of the following: transaction data, merchant data, product data, or any combination thereof. For example, the transaction data (TD) may include sufficient information regarding the purchased product or service for the purpose of allowing the merchant to complete the transaction. In non-limiting embodiments or aspects, the transaction data (TD) includes some or a portion of the data corresponding to the data in the secured transaction payload (STP). Finally, the merchant system 106a, 106b transmits a payment request (PR) to the transaction processing server 202, and this payment request (PR) includes or is associated with the secured transaction payload (STP).

In non-limiting embodiments or aspects, the communication (C) is generated based at least partially on a transaction interaction (TI) of a smart appliance user (U), and the communication (C) is transmitted after payment information associated with the transaction interaction (TI) is received. Accordingly, the financial information (e.g., the user's PAN, expiration data, and personal information), is already known within the system 200 and is not transmitted through the smart appliance 108 in an unprotected manner. In non-limiting embodiments or aspects, and as discussed above, the authorization request (AR) may be generated and transmitted by or through the user device 110 to the transaction processing server 202 based at least partially on a communication between the at least one smart appliance 108 and the user device 110.

In non-limiting embodiments or aspects, provided is a system 100 for segmenting and communicating in a smart appliance environment, the system 100 including at least one server 102 having at least one processor programmed or configured to: (a) generate a plurality of PICs; (b) assign at least one PIC to each of a plurality of products of at least one merchant; (c) based at least partially on a profile 112 of a smart appliance user (U), associate at least one PIC with an interaction (I) between the smart appliance user (U) and at least one smart appliance 108; (d) match the at least one PIC of at least one product with the at least one PIC associated with the interaction (I); and (e) automatically generate and transmit at least one communication (C) to the smart appliance user (U).

In non-limiting embodiments or aspects, provided is a computer program product for segmenting and communicating in a smart appliance environment, including at least one non-transitory computer-readable medium having program instructions stored thereon, which, when executed by at least one processor, causes the at least one processor to: (a) generate a plurality of PICs; (b) assign at least one PIC to each of a plurality of products of at least one merchant; (c) based at least partially on a profile 112 of a smart appliance user (U), associate at least one PIC with an interaction (I) between the smart appliance user (U) and at least one smart appliance 108; (d) match the at least one PIC of at least one product with the at least one PIC associated with the interaction (I); and (e) automatically generate and transmit at least one communication (C) to the smart appliance user (U).

In this manner, the present disclosure provides an improved computer-implemented method, system, and computer program product for smart appliance product segmentation and communication.

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A computer-implemented method for smart appliance product segmentation and communication, comprising:
    generating, by at least one server, a plurality of product interest codes;
    receiving, by the at least one server from at least one merchant system, product data associated with a plurality of products;
    assigning, by the at least one server, at least one first product interest code of the plurality of product interest codes to each product of the plurality of products;
    receiving, by the at least one server from at least one smart appliance, interaction data associated with an interaction between a smart appliance user and the at least one smart appliance;
    based at least partially on a profile of the smart appliance user, associating, by the at least one server, at least one second product interest code of the plurality of product interest codes with the interaction between the smart appliance user and the at least one smart appliance;
    matching, by the at least one server, the at least one first product interest code of at least one product with the at least one second product interest code associated with the interaction, wherein the matching is a dynamic process which is refined based upon a feedback interaction between the smart appliance user and the smart appliance;
    based at least partially on assigning the at least one first product interest code, associating the at least one second product interest code, and matching the at least one first product interest code and the at least one second product interest code, automatically generating and transmitting, by the at least one server, at least one personalized communication to the smart appliance user, wherein the personalization of the communication is based at least partially on profile data associated with the smart appliance user;
    receiving, by the at least one server from the at least one smart appliance, feedback interaction data associated with at least one feedback interaction between the smart appliance user and the at least one smart appliance;
    based at least partially on the feedback interaction, modifying, by the at least one server, at least one product interest code of the plurality of product interest codes assigned to the at least one product; and
    based at least partially on the feedback interaction and modification of at least one product interest code of the plurality of product interest codes assigned to the at least one product, automatically generating and transmitting, by the at least one server, at least one subsequent personalized communication including revised content.

2. The method of claim 1, wherein at least one first product interest code of the plurality of product interest codes comprises at least one of the following: a stock keeping unit (SKU), a universal product code (UPC), a category, a subcategory, a product category, a product group, a project code, a weight, a ranking, a partner-assigned code, a merchant-assigned code, a user-assigned code, an alphanumeric code, or any combination thereof.

3. The method of claim 1, wherein the plurality of products are segmented according to at least one of the following: smart appliance type, partner, merchant, transaction type, merchant data, user data, subscription data, weighting data, ranking data, or any combination thereof.

4. The method of claim 1, wherein the at least one personalized communication comprises at least one of the following: an advertisement, an offer, a discount, a link, an interactive interface, a selectable element, a voice-based communication, a plurality of products, or any combination thereof.

5. The method of claim 1, wherein the interaction is a transaction interaction between the smart appliance user and at least one of the following: the at least one smart appliance, a point-of-sale, a smart phone, a computer, or any combination thereof.

6. The method of claim 5, wherein the interaction comprises a transaction interaction between the smart appliance user and the at least one smart appliance, and wherein the at least one personalized communication comprises an advertisement for purchase of at least one product.

7. The method of claim 1, wherein the profile of the smart appliance user comprises at least one of the following: user data, transaction data, browsing data, searching data, historical data, a response to a query, behavioral data, interaction data, interest data, at least one product interest code, or any combination thereof.

8. The method of claim 7, wherein associating, by the at least one server, at least one second product interest code of the plurality of product interest codes with the interaction between the smart appliance user and the at least one smart appliance further comprises:
analyzing the profile of the smart appliance user;
analyzing the interaction between the smart appliance user and the at least one smart appliance; and
assigning at least one product interest code to the interaction.

9. The method of claim 8, wherein the analysis is performed by at least one of the following: a computer, a server, the at least one smart appliance, a merchant server, a transaction processing server, a third-party server, or any combination thereof.

10. The method of claim 1, wherein each of the plurality of products is associated with at least one of the following: merchant name, product name, product image, short description, detailed description, video, unit price, delivery method, delivery costs, stock data, inventory data, promotional data, or any combination thereof.

11. The method of claim 1, wherein the feedback interaction comprises at least one of the following: user interaction with the at least one smart appliance, user interaction with a link, transaction success, transaction failure, transaction termination, user viewing behavior, user online interaction, or any combination thereof.

12. The method of claim 1, wherein the at least one first product interest code comprises at least one weight or rank, wherein matching the at least one first product interest code of the at least one product with the at least one second product interest code associated with the interaction is performed at least partially based on the at least one weight or rank.

13. The method of claim 1, wherein matching the at least one first product interest code of the at least one product with the at least one second product interest code associated with the interaction is performed based upon a one-to-one match between the product interest code of the product and the product interest code associated with the feedback interaction between the smart applicant user and the smart appliance.

14. The method of claim 1,
wherein assigning, by the at least one server, the at least one first product interest code of the plurality of product interest codes to each product of the plurality of products further comprises:
assigning, by the at least one server, each product of the plurality of products to at least one of the following: a partner category, a smart appliance category, a user category, a product-type category, an interest category, at least one product interest code, or any combination thereof.

15. The method of claim 1, wherein the interaction is a transaction interaction, the method comprising:
transmitting, by the at least one smart appliance, a communication request comprising at least one of the following: a partner category, a smart appliance category, a user category, a product-type category, an interest category, at least one product interest code, or any combination thereof;
determining, by the at least one server, at least one qualifying merchant;
determining, by the at least one server, at least one applicable smart appliance category; and
determining, by the at least one server, the at least one product based at least partially on at least one of the following: the at least one product interest code, at least one weight, at least one rank, or any combination thereof.

16. The method of claim 1, wherein the profile of the smart appliance user is generated based on data from at least one of the following: a transaction processing provider, the at least one smart appliance, a third-party server, a partner, a merchant, or any combination thereof.

17. A system for segmenting and communicating in a smart appliance environment, comprising at least one server including at least one processor programmed or configured to:
generate a plurality of product interest codes;
receive, from at least one merchant system, product data associated with a plurality of products;
assign at least one first product interest code of the plurality of product interest codes to each product of the plurality of products;
receive interaction data associated with an interaction between a smart appliance user and at least one smart appliance;
based at least partially on a profile of the smart appliance user, associate at least one second product interest code of the plurality of product interest codes with the interaction between the smart appliance user and the at least one smart appliance;
match the at least one first product interest code of at least one product with the at least one second product interest code associated with the interaction, wherein the matching is a dynamic process which is refined based upon a feedback interaction between the smart appliance user and the smart appliance;
based at least partially on assigning the at least one first product interest code, associating the at least one second product interest code, and matching the at least one first product interest code and the at least one second product interest code, automatically generate and transmit at least one personalized communication to the smart appliance user, wherein the personalization of the communication is based at least partially on profile data associated with the smart appliance user;
receive feedback interaction data associated with at least one feedback interaction between the smart appliance user and the at least one smart appliance;
based at least partially on the feedback interaction, modify at least one product interest code of the plurality of product interest codes assigned to the at least one product; and
based at least partially on the feedback interaction and modification of the at least one product interest code of the plurality of product interest codes assigned to the at least one product, automatically generate and transmit at least one subsequent personalized communication including revised content.

18. A computer program product for segmenting and communicating in a smart appliance environment, comprising at least one non-transitory computer-readable medium having program instructions stored thereon, which, when executed by at least one processor, causes the at least one processor to:
generate a plurality of product interest codes;
receive, from at least one merchant system, product data associated with a plurality of products;

assign at least one first product interest code of the plurality of product interest codes to each product of a plurality of products;

receive interaction data associated with an interaction between a smart appliance user and at least one smart appliance;

based at least partially on a profile of the smart appliance user, associate at least one second product interest code of the plurality of product interest codes with the interaction between the smart appliance user and the at least one smart appliance;

match the at least one first product interest code of at least one product with the at least one second product interest code associated with the interaction, wherein the matching is a dynamic process which is refined based upon a feedback interaction between the smart appliance user and the smart appliance;

based at least partially on assigning the at least one first product interest code, associating the at least one second product interest code, and matching the at least one first product interest code and the at least one second product interest code, automatically generate and transmit at least one personalized communication to the smart appliance user, wherein the personalization of the communication is based at least partially on profile data associated with the smart appliance user;

receive feedback interaction data associated with at least one feedback interaction between the smart appliance user and the at least one smart appliance;

based at least partially on the feedback interaction, modify at least one product interest code of the plurality of product interest codes assigned to the at least one product; and based at least partially on the feedback interaction and modification of at least one product interest code of the plurality of product interest codes assigned to the at least one product, automatically generate and transmit at least one subsequent personalized communication including revised content.

\* \* \* \* \*